(12) United States Patent
Jung et al.

(10) Patent No.: US 11,007,424 B2
(45) Date of Patent: May 18, 2021

(54) VIRTUAL GOLF SIMULATION APPARATUS, METHOD OF REALIZING IMAGE FOR VIRTUAL GOLF, AND COMPUTING-DEVICE-READABLE RECORDING MEDIUM HAVING THE SAME RECORDED THEREIN

(71) Applicant: GOLFZON CO., LTD., Daejeon (KR)

(72) Inventors: Woo Jin Jung, Seoul (KR); Min Yong Cho, Seoul (KR)

(73) Assignee: GOLFZON CO., LTD., Daejeon (KR)

( * ) Notice: Subject to any disclaimer, the term of this patent is extended or adjusted under 35 U.S.C. 154(b) by 516 days.

(21) Appl. No.: 16/085,590

(22) PCT Filed: Mar. 14, 2017

(86) PCT No.: PCT/KR2017/002749
§ 371 (c)(1),
(2) Date: Sep. 17, 2018

(87) PCT Pub. No.: WO2017/160060
PCT Pub. Date: Sep. 21, 2017

(65) Prior Publication Data
US 2021/0016159 A1    Jan. 21, 2021

(30) Foreign Application Priority Data
Mar. 17, 2016  (KR) .......................... 10-2016-0032393

(51) Int. Cl.
*A63F 13/00*    (2014.01)
*A63F 7/06*    (2006.01)
*A63F 13/812*    (2014.01)

(52) U.S. Cl.
CPC .............. *A63F 7/06* (2013.01); *A63F 13/812* (2014.09)

(58) Field of Classification Search
None
See application file for complete search history.

(56) References Cited

FOREIGN PATENT DOCUMENTS

| | | |
|---|---|---|
| JP | 1991-046376 U | 4/1991 |
| JP | 2004-334145 A | 11/2004 |
| KR | 10-0972826 B1 | 7/2010 |
| KR | 10-2010-0124899 A | 11/2010 |
| KR | 10-1031475 B1 | 4/2011 |
| KR | 10-2011-0125526 A | 11/2011 |
| KR | 10-2012-0036156 A | 4/2012 |
| KR | 10-2013-0047081 A | 5/2013 |

OTHER PUBLICATIONS

International Search Report for PCT/KR2017/002749 dated Jun. 16, 2017 from Korean Intellectual Property Office.

*Primary Examiner* — Paul A D'Agostino
(74) *Attorney, Agent, or Firm* — Revolution IP, PLLC

(57) ABSTRACT

Disclosed herein are a virtual golf simulation apparatus and a method of realizing an image for virtual golf that are capable of realizing an image that provides greater realism to a user who plays golf using images realized on a front screen and on a floor screen in a user golf play space and of enabling a simulation image output through the front screen and the floor screen to naturally progress as a golf game progresses.

13 Claims, 8 Drawing Sheets

VIRTUAL GOLF SIMULATION APPARATUS, METHOD OF REALIZING IMAGE FOR VIRTUAL GOLF, AND COMPUTING-DEVICE-READABLE RECORDING MEDIUM HAVING THE SAME RECORDED THEREIN

TECHNICAL FIELD

The present invention relates to a virtual golf simulation apparatus and a method of realizing an image for virtual golf, and more particularly to a virtual golf simulation apparatus and a method of realizing an image for virtual golf that are capable of realizing an image simulating the trajectory of a golf ball hit by a user on a virtual golf course realized as an image through a screen based on the result of sensing the golf ball such that the user can play a round of golf or practice golf in a virtual space.

BACKGROUND ART

With the recent upsurge in the number of golfers, a so-called screen golf system, which enables a golfer to practice golf and to play a round of virtual golf using a virtual golf simulation system, has gained popularity.

The screen golf system may be realized by a virtual golf simulation apparatus that senses the velocity and direction of a golf ball that a golfer hits onto a screen installed indoors to display a virtual golf course and displays the progress of the golf ball on the screen. The technology of the screen golf system has evolved in order to enable a user to feel the same realism that the user feels when playing a round of golf on an actual golf course, which exceeds the level of enjoyment of a golf game that is simply played indoors.

However, a screen golf system including a general virtual golf simulation apparatus is limited in its ability to provide the same sense of realism that the user feels when the user plays a round of golf on an actual golf course because a virtual golf course and an image simulating the trajectory of a golf ball on the virtual golf course are realized only through a screen installed in front of the location at which the user hits the golf ball.

In order to overcome this limitation and to provide greater realism to users who enjoy screen golf, technology for realizing an image on a floor between the front screen and a shot plate as well as on the front screen has been proposed.

Korean Patent Application No. 10-2009-0043833 (entitled SCREEN GOLF SYSTEM USING STEREOSCOPIC IMAGE), Japanese Utility Model Application Publication No. 1991-046376 (entitled GOLF PLAY APPARATUS), and Japanese Patent Application Publication No. 2004-334145 (entitled METHOD OF THREE-DIMENSIONALLY CONFIGURING SCREEN TO DISPLAY SPACE) are disclosed as prior art documents related thereto.

However, the above-described prior art documents describe only outputting images to a front screen and to a floor screen. That is, images are output to the floor screen as well as the front screen, unlike the conventional case in which an image is output only to the front screen. When a user plays a virtual golf game, therefore, it is difficult to provide the same sense of realism that the user feels when the user plays a round of golf on an actual golf course.

DISCLOSURE

Technical Problem

It is an object of the present invention to provide a virtual golf simulation apparatus and a method of realizing an image for virtual golf that are capable of realizing an image that provides greater realism to a user who plays golf using images realized on a front screen and on a floor screen in a user golf play space and of enabling a simulation image output through the front screen and the floor screen to naturally progress as a golf game progresses.

Technical Solution

In accordance with an aspect of the present invention, the above and other objects can be accomplished by the provision of a virtual golf simulation apparatus including an image output device for outputting an image to a front screen provided in front of the location at which a user putts a golf ball and to a floor screen provided on a floor between a shot plate, on which the user putts the golf ball, and the front screen and outputting an image of a virtual green for putting of the user to the front screen and to the floor screen, a sensing device for sensing the golf ball and generating sensing information of the golf ball putted by the user, and a simulator including an image-processor for processing an image to be output by the image output device and a controller for performing control such that a simulation image in which a virtual ball is moved on the virtual green is realized based on the sensing information sensed by the sensing device, performing control such that, depending on the distance between the virtual ball and a hole cup on the virtual green, the hole cup appears on the front screen image or on the floor screen image, and performing control such that the simulation image in which the virtual ball is moved is realized on the floor screen image with respect to the hole cup in response to the putting of the user.

The image output device may include a first image output device for outputting an image to the front screen and a second image output device for outputting an image to the floor screen, and the controller may divide the image generated by the image-processor into a first image, which is an image part to be output to the front screen, and a second image, which is an image part to be output to the floor screen, and may perform control such that the first image is output to the front screen through the first image output device and such that the second image is output to the floor screen through the second image output device.

The controller may be configured to receive position information of the golf ball placed at the location at which the golf ball is to be putted from the sensing device and to perform control such that, in the case in which the distance between the virtual ball and the hole cup on the image is less than a predetermined distance, an image in which the hole cup appears on the floor screen image is realized in such a manner that the distance between the virtual ball and the hole cup becomes substantially equal to the distance between the golf ball and the hole cup.

The controller may be configured to receive position information of the golf ball placed at the location at which the golf ball is to be putted from the sensing device, to preset a relationship between the distance between the virtual ball and the hole cup on the image and the distance between the golf ball and the hole cup, and to perform control such that, in the case in which the distance between the virtual ball and the hole cup is less than a predetermined distance, an image in which the hole cup appears on the floor screen image is realized based on the position of the golf ball according to the predetermined relationship with respect to the distance between the virtual ball and the hole cup.

In the case in which the image of the virtual green is realized on the front screen and on the floor screen such that the hole cup is located on the front screen image, the controller may be configured to perform control such that a simulation image in which the virtual ball is moved is realized based on the sensing information received from the sensing device when the user putts the golf ball and to perform control to realize an image in which the front screen image is moved to the floor screen image at a predetermined speed or at a speed corresponding to the movement speed of the virtual ball when the virtual ball is moved in such a manner that the hole cup appears on the floor screen image.

The controller may perform control such that the image-processor generates a sub-image that is simulated in the same manner as a simulation image in which the virtual ball is moved on the floor screen image and such that the sub-image is output to the front screen.

The controller may perform control such that the sub-image is generated as an image that is simulated in the same manner as a main image, which is a simulation image in which the virtual ball is moved on the floor screen image, while having the same view as the main image or an image that is simulated in the same manner as the main image while having a predetermined view different from the view of the main image and such that the sub-image is displayed at one side of the front screen image as a screen having a predetermined size.

In accordance with another aspect of the present invention, there is provided a method of realizing an image for virtual golf in which images are output to a front screen provided in front of the location at which a user putts a golf ball and to a floor screen provided on a floor between a shot plate, on which the user putts the golf ball, and the front screen such that an image of a virtual green for putting of the user is realized and output to the front screen and to the floor screen through an image output device, the method including a sensing device transmitting a result of sensing the golf ball to a controller, the controller performing control such that, depending on the distance between a virtual ball and a hole cup on the virtual green, an image in which the hole cup appears on the front screen image or on the floor screen image is realized, and the controller performing control such that a simulation image in which the virtual ball is moved on the virtual green is realized on the floor screen image with respect to the hole cup based on sensing information received from the sensing device in response to the putting of the user.

The method may further include the controller receiving position information of the golf ball placed at the location at which the golf ball is to be putted from the sensing device, wherein the step of performing control such that the image in which the hole cup appears on the front screen image or on the floor screen image is realized may include determining whether the distance between the virtual ball and the hole cup on the image is less than a predetermined distance, and upon determining that the distance between the virtual ball and the hole cup is less than the predetermined distance, performing control such that an image in which the hole cup appears on the floor screen image is realized in such a manner that the distance between the virtual ball and the hole cup becomes substantially equal to the distance between the golf ball and the hole cup.

The method may further include the controller receiving position information of the golf ball placed at the location at which the golf ball is to be putted from the sensing device, wherein the step of performing control such that the image in which the hole cup appears on the front screen image or on the floor screen image is realized may include determining whether the distance between the virtual ball and the hole cup on the image is less than a predetermined distance, and upon determining that the distance between the virtual ball and the hole cup is less than the predetermined distance, performing control such that an image in which the hole cup appears on the floor screen image is realized based on the position of the golf ball according to a predetermined relationship between the distance between the virtual ball and the hole cup and the distance between the golf ball and the hole cup.

The step of performing control such that the image in which the hole cup appears on the front screen image or on the floor screen image is realized may include performing control such that the image of the virtual green is realized on the front screen and on the floor screen such that the hole cup is located on the front screen image, and may further include the controller performing control such that a simulation image in which the virtual ball is moved is realized based on the sensing information received from the sensing device when the user putts the golf ball, and performing control to realize an image in which the front screen image is moved to the floor screen image at a predetermined speed or at a speed corresponding to the movement speed of the virtual ball when the virtual ball is moved in such a manner that the hole cup appears on the floor screen image.

The method may further include generating a sub-image that is simulated in the same manner as a simulation image in which the virtual ball is moved on the floor screen image, and transmitting the generated sub-image to the image output device such that the sub-image is output to the front screen.

The step of generating the sub-image may include performing control such that the sub-image is generated as an image that is simulated in the same manner as a main image, which is a simulation image in which the virtual ball is moved on the floor screen image, while having the same view as the main image or an image that is simulated in the same manner as the main image while having a predetermined view different from the view of the main image, and the step of performing control such that the sub-image is output to the front screen may include performing control such that the sub-image is displayed at one side of the front screen image as a screen having a predetermined size.

The image may be realized such that the sub-image is temporally synchronized with the main image.

In accordance with a further aspect of the present invention, there is provided a computing-device-readable recording medium having a program for performing the method of realizing the image for virtual golf recorded therein.

Advantageous Effects

A virtual golf simulation apparatus and a method of realizing an image for virtual golf according to the present invention have effects in that the virtual golf simulation apparatus, realizing images on a front screen and a floor screen in a user golf play space, realizes an image capable of providing a user who plays golf with greater realism using the front screen image and the floor screen image and in that a simulation image output through the front screen and the floor screen naturally progresses as a golf game progresses.

In addition, a simulation image of putting performed on the floor screen image is realized in order to provide a user who is playing golf with the same realism that the user feels when putting on a green of an actual golf course, and a separate sub-image is also realized in order to provide other user(s) who enjoy the golf game with the same convenience as that experienced when watching a golf broadcast and with immersiveness in the game.

BEST MODE

A virtual golf simulation apparatus and a method of realizing an image for virtual golf according to the present invention will be described in more detail with reference to the accompanying drawings.

First, the construction of a virtual golf simulation apparatus according to an embodiment of the present invention will be described with reference to FIGS. 1 and 2.

Figure 1:
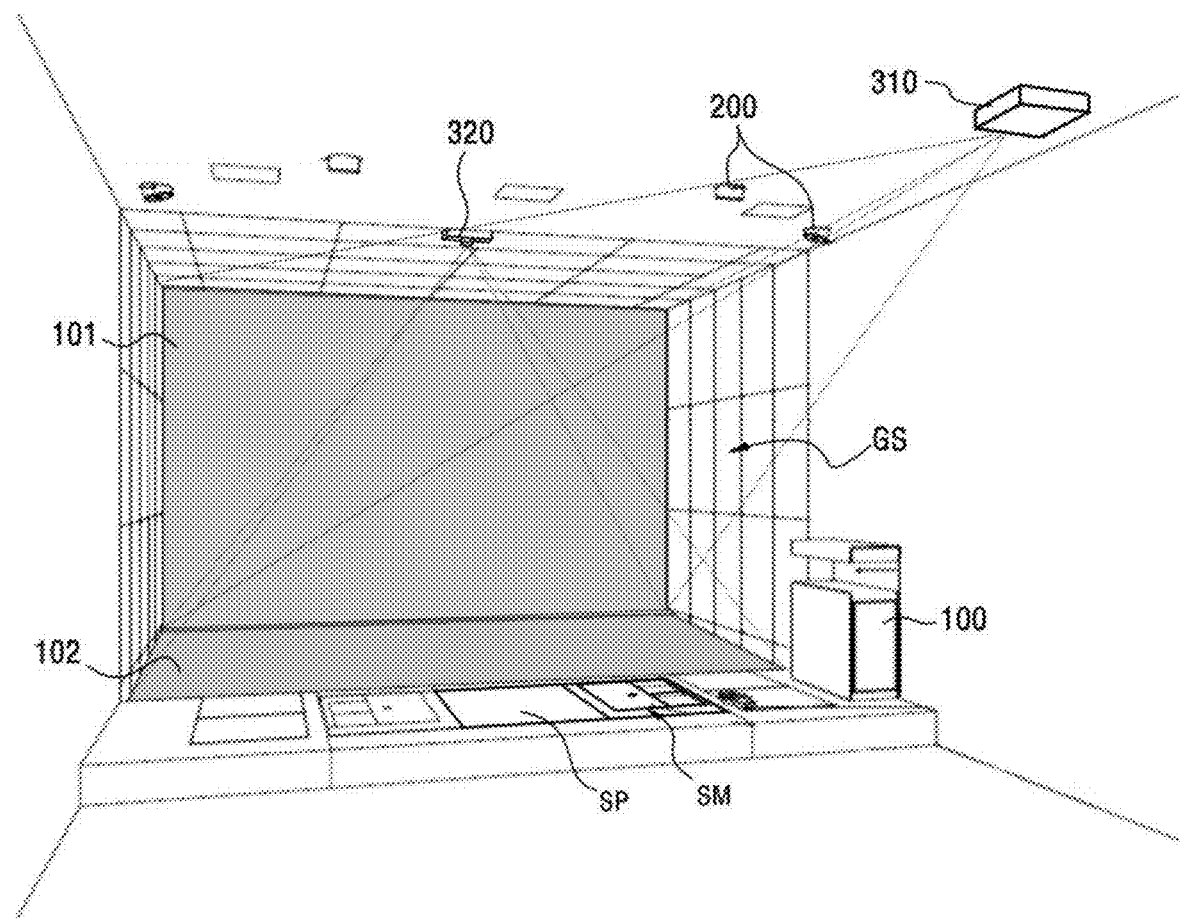
FIG. 1 is a view showing a screen golf system realized by a virtual golf simulation apparatus according to an embodiment of the present invention.
Figure 2:
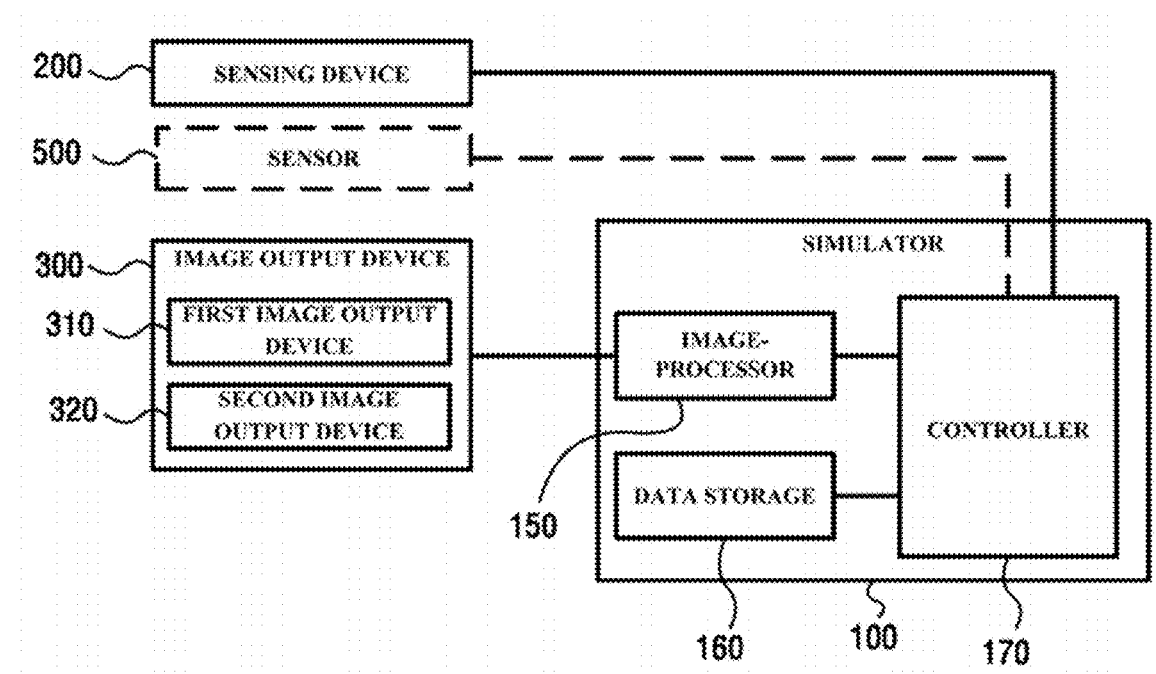
FIG. 2 is a block diagram showing the construction of the virtual golf simulation apparatus according to the embodiment of the present invention.

FIG. 1 is a view showing a screen golf system realized by a virtual golf simulation apparatus according to an embodiment of the present invention, and FIG. 2 is a block diagram showing the construction of the virtual golf simulation apparatus according to the embodiment of the present invention.

As shown in FIGS. 1 and 2, the virtual golf simulation apparatus according to the embodiment of the present invention may include a simulator 100, a sensing device 200, and an image output device 300. In some embodiments, the virtual golf simulation apparatus may further include a separate sensor 500.

As shown in FIG. 1, the virtual golf simulation apparatus according to the embodiment of the present invention is configured such that a shot plate SP, on which a user takes a golf swing, a front screen 101, which is installed in front of a shot mat SM, on which a golf ball to be hit by the user using a golf club is placed, and a floor screen 102, which is installed on a floor between the front screen 101 and the shot plate SP, are provided in a golf play space GS having a predetermined size, whereby the user may play virtual golf using the screen golf system.

The image output device 300 may include a single image output device, which simultaneously outputs images to the front screen 101 and to the floor screen 102. Specifically, the image output device 300 may be configured such that an image to be output to the front screen 101 and an image to be output to the floor screen 102 are simultaneously projected by the single image output device. As shown in FIGS. 1 and 2, the image output device 300 may include a first image output device 310 for outputting an image to the front screen 101 and a second image output device 320 for outputting an image to the floor screen 102.

As shown in FIGS. 1 and 2, the first image output device 310 outputs an image to the front screen 101 while the second image output device 320 outputs an image to the floor screen 102 such that the image output to the front screen 101 and the image output to the floor screen 102 constitute a single image for virtual golf.

Here, the horizontal lengths of the front screen 101 and the floor screen 102 may be substantially equal to each other, and the vertical lengths of the front screen 101 and the floor screen 102 may be substantially equal to each other. Alternatively, at least the horizontal lengths of the front screen 101 and the floor screen 102 may be equal to each other.

That is, the front screen 101 and the floor screen 102 may be connected to each other in order to constitute a single screen, or may be provided separately. Even in the case in which the front screen 101 and the floor screen 102 are provided separately, images may be connected to each other in order to constitute a single image. For this reason, at least the horizontal lengths of the front screen 101 and the floor screen 102 may be equal to each other.

An image that is processed by the simulator 100 may be divided into two images. One of the divided images may be transmitted to the first image output device 310, which may output the image. The other of the divided images may be transmitted to the second image output device 320, which may output the image.

As shown in FIG. 2, the simulator 100 includes an image-processor 150, a data storage 160, and a controller 170. Basically, the image-processing device generates an image of a virtual golf course, on which the user plays golf, and outputs the generated image to the respective screens. In addition, the image-processing device generates a simulation image, in which a virtual ball moves, based on information about the motion of a golf ball sensed and calculated by the sensing device 200 when the user hits the golf ball on the shot plate SP, and outputs the generated simulation image to the respective screens.

The data storage 160 may be configured to store various kinds of information about the operation of the virtual golf simulation apparatus according to the embodiment of the present invention and to store image data necessary to realize a virtual golf course image.

Alternatively, data necessary to realize a virtual golf course image may be stored in a database of a server (not shown), a piece of the data necessary to realize the virtual golf course image selected by the user may be extracted from the database of the server and may then be transmitted to the simulator 100, and the transmitted data may be temporarily stored in the data storage 160.

The image-processor 150 is configured to process all images related to virtual golf simulation, such as an image of a virtual golf course, an image of the motion of a ball, and an image for menu selection, as data received from the data storage 150 or from the server (not shown).

The controller 170 is configured to perform various calculations for virtual golf simulation and control of the respective elements.

In particular, the controller 170 controls the image-processor 150 such that an image that is output through the respective image output devices 310 and 320, such as an image of a virtual golf course or a simulation image in which a virtual ball is moved, is generated by the image-processor 150 and such that the generated image is divided into a first image, which is output through the first image output device 310, and a second image, which is output through the second image output device 320.

After the image is processed by the image-processor 150, the first image or an image obtained by performing predetermined image processing on the first image is transmitted to the first image output device 310, which outputs the same to the front screen 101, and the second image or an image obtained by processing the second image is transmitted to the second image output device 320, which outputs the same to the floor screen 102.

Meanwhile, the sensing device 200 is a device that senses the motion of at least one of a golf club or a golf ball when the user takes a golf swing.

The sensing device 200 may be realized in any of various forms. The sensing device may be an infrared-sensor-type sensing device, which emits infrared rays, receives the infrared rays reflected by a golf club head or a ball that is moved when the user hits the ball, and analyzes the reflected infrared rays in order to sense the motion of the golf club head or the ball, a laser-sensor-type sensing device, which emits laser beams and then senses and analyzes the laser beams blocked by a golf club head or a ball that is moved in order to sense the motion of the golf club head or the ball, or an image-sensor-type sensing device, which collects and analyzes images of a ball hit as the result of the user taking a golf swing using a golf club in order to sense the motion of the ball.

In the case in which the sensing device 200 is an image-sensor-type sensing device, it is possible to sense a greater number of objects than when using other types of sensing devices. For example, the sensing device may acquire an image of the shot plate in order to sense the position on the shot mat SM on which a golf ball is placed, and may sense the motion of the golf ball placed on the shot mat in order to sense whether the user is ready to hit the golf ball. Furthermore, the sensing device may also sense the motion of the user in order to obtain information about whether the user is ready to hit the golf ball based on information about whether the user stands on the shot plate or whether the user remains stationary for a predetermined amount of time.

Of course, it is possible to sense the motion of the user using the separate sensor 500, for example, a depth camera device.

Hereinafter, a method of realizing an image for virtual golf used in the virtual golf simulation apparatus according to the embodiment of the present invention will be described in more detail with reference to FIGS. 3 to 8.

Figure 3:
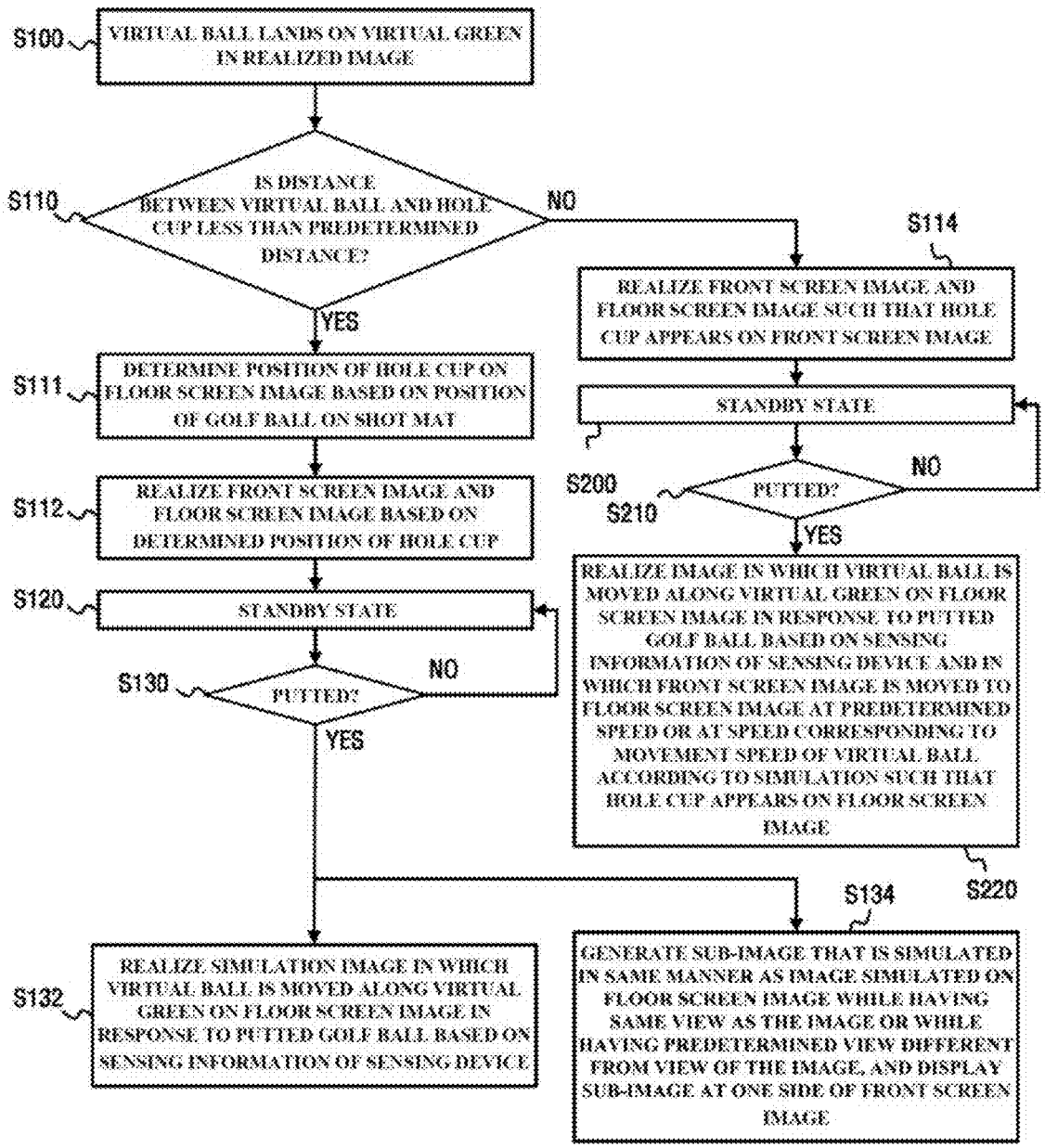
FIG. 3 is a flowchart showing a method of realizing an image for virtual golf according to an embodiment of the present invention.

FIG. 3 is a flowchart showing a method of realizing an image for virtual golf used in the virtual golf simulation apparatus according to the embodiment of the present invention, and FIGS. 4 to 8 are detailed views showing examples of images realized according to the flowchart shown in FIG. 3.

Referring first to FIG. 3, in the case in which a virtual ball lands on a virtual green in an image realized as a golf game progresses (S100), the controller of the simulator determines whether the distance between the virtual ball and a hole cup on the virtual green is less than a predetermined distance (S110).

The sensing device senses a golf ball placed on the shot mat, and transmits position coordinate information of the golf ball to the simulator. The controller of the simulator stores the position coordinate information of the golf ball on the shot mat, which is received from the sensing device.

Upon determining at step S110 that the distance between the virtual ball and the hole cup on the virtual green is less than the predetermined distance, the controller of the simulator determines the position of the hole cup on the floor screen image based on the position of the golf ball on the shot mat (S111). Subsequently, the controller performs control such that the front screen image and the floor screen image are realized based on the determined position of the hole cup (S112).

For example, in the case in which the predetermined distance between the virtual ball and the hole cup on the virtual green is 5 m and the distance between the virtual ball and the hole cup on the current image is 3 m, the controller may determine the position of the hole cup on the floor screen image such that the hole cup is displayed on a portion of the floor screen image that is 3 m ahead of the position of the golf ball on the shot mat, and may perform control such that an image is realized around the determined position of the hole cup.

In the above example, an image in which the hole cup appears on the floor screen image is realized such that the distance between the virtual ball and the hole cup on the image becomes substantially equal to the distance between the actual golf ball and the hole cup on the image.

Another example is possible. The controller of the simulator may preset the relationship between the distance between the virtual ball and the hole cup on the image and the distance between the actual golf ball and the hole cup on the image, and may determine the position of the hole cup on the image based on the position of the actual golf ball according to the predetermined relationship with respect to the distance between the virtual ball and the hole cup on the current image.

For example, the relationship may be preset such that, in the case in which the distance between the virtual ball and the hole cup on the image is 10 m, the distance between the actual golf ball and the hole cup on the image is 5 m, such that, in the case in which the distance between the virtual ball and the hole cup on the image is 9 m, the distance between the actual golf ball and the hole cup on the image is 4.5 m, and such that, in the case in which the distance between the virtual ball and the hole cup on the image is 8 m, the distance between the actual golf ball and the hole cup on the image is 4 m.

In the case in which the predetermined distance between the virtual ball and the hole cup on the virtual green is less than 10 m and the distance between the virtual ball and the hole cup on the current image is 8 m, the position of the hole cup on the floor screen image may be determined such that the hole cup is displayed on the portion of the floor screen image that is 4 m ahead of the position of the golf ball on the shot mat, since the distance between the actual golf ball and the hole cup on the image is preset to 4 m, as in the above example, and an image may be realized around the determined position of the hole cup.

Meanwhile, in the case in which the image is realized, as described above, the sensing device senses the user putting the actual golf ball in a standby state (S120).

Upon sensing the user putting the golf ball (S130), the sensing device senses the motion of the golf ball as the result of putting, calculates sensing information of the motion of the golf ball, for example, parameters of the golf ball, such as the speed, the direction, and the angle of the golf ball, and transmits the calculated sensing information to the simulator, which realizes a simulation image in which the virtual ball is moved along the virtual green on the floor screen image in response to the putted golf ball based on the sensing information (S132).

Figure 4:
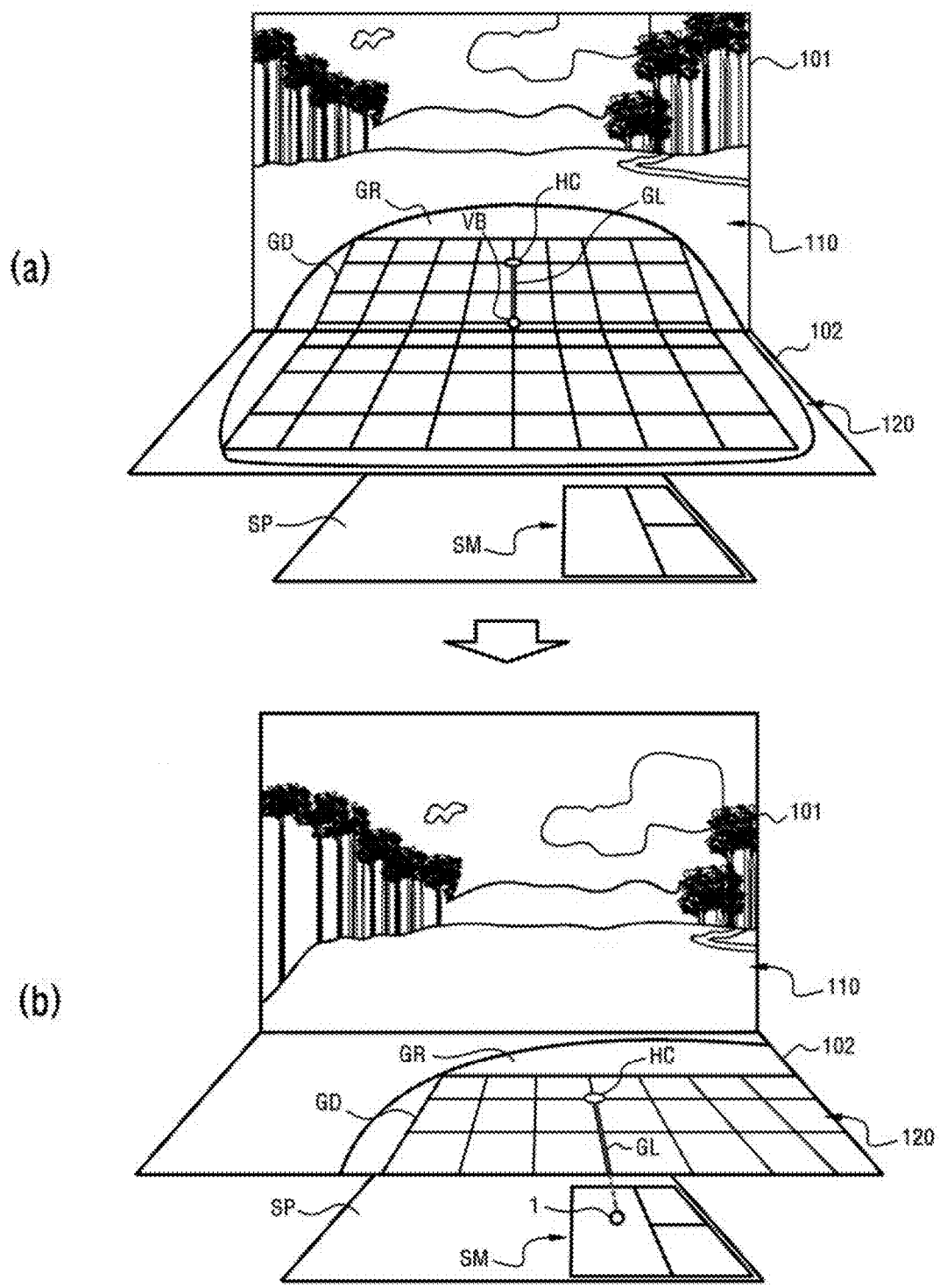
FIGS. 4 to 8 are views showing examples of images realized according to the method of realizing the image for virtual golf shown in FIG. 3.

An example of the process performed at steps S110 to S132 is shown in FIG. 4.

Referring to FIG. 4, an image of a virtual green GR and a grid GD indicating information about the topography of the green is realized over a front screen image 110 and a floor screen image 120, and a hole cup HC appears on the front screen image 110, as shown in FIG. 4(*a*), before the simulator enters the standby state (S120).

In addition, as shown in FIG. 4(a), a virtual ball VB appears on the front screen image 110 so as to face the hole cup HC, and a guide line GL may be displayed from the virtual ball VB to the hole cup HC.

At this time, when a golf ball 1 is placed on the shot mat SM and hitting readiness is completed through the sensing of the sensing device (upon sensing that the ball does not move, the sensing device may generate a ball-ready signal, and when the ball-ready signal is generated, the controller may determine that hitting readiness is completed), the controller of the simulator calculates the shift distance and the shift direction from the position of the virtual ball VB to the position of the golf ball 1 placed on the shot mat SM, and performs control such that the image is shifted to the state shown in FIG. 4(b) depending on the calculated shift distance and shift direction.

That is, FIG. 4(a) shows the case in which the distance between the hole cup HC and the virtual ball VB is less than the predetermined distance. In this case, the image is shifted to the state shown in FIG. 4(b) such that the position of the virtual ball appearing on the front screen image 110 coincides with the position of the actual golf ball. At this time, an image in which the hole cup HC is located on the floor screen image 120 based on the position of the actual golf ball may be realized so as to be equal to the distance between the virtual ball VB and the hole cup HC in the state shown in FIG. 4(a), according to the predetermined relationship, as described above.

Figure 5:
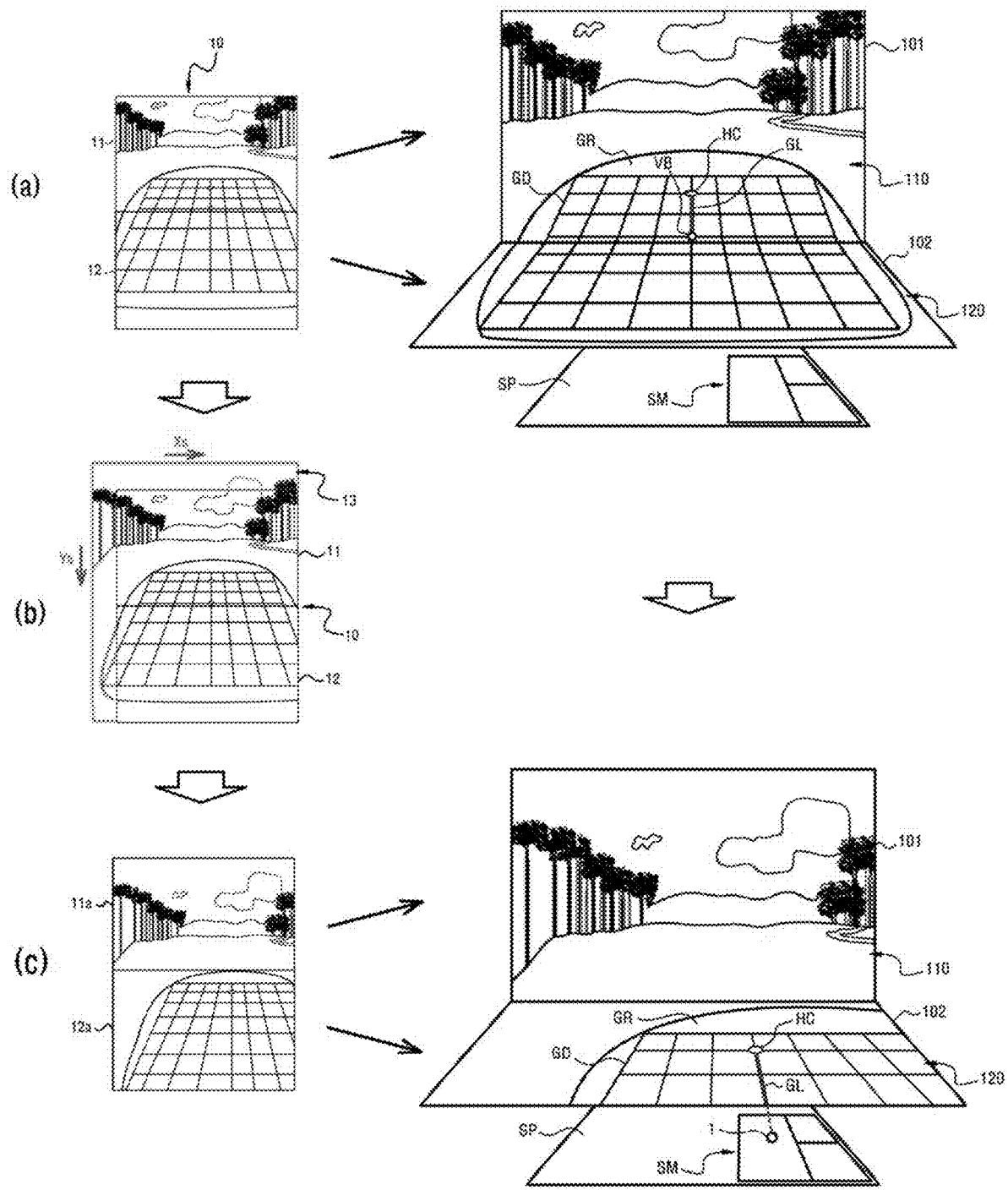

Hereinafter, an example in which the image is shifted, as shown in FIG. 4, will be described in more detail with reference to FIG. 5.

FIG. 5(a) shows the case in which the front screen image and the floor screen image shown in FIG. 4(a) are output through an image generated by the image-processor, FIG. 5(b) shows the case in which the image is shifted by the image-processor, and FIG. 5(c) shows the case in which the image shifted by the image-processor is realized through the front screen image and the floor screen image shown in FIG. 4(b).

As shown in FIG. 5(a), the image-processor of the simulator of the virtual golf simulation apparatus according to the embodiment of the present invention generates an entire image 10 to be output to the front screen 101 and to the floor screen 102, and the controller divides the generated image into a part 11 to be output to the front screen (hereinafter, referred to as a "first image") and a part 12 to be output to the floor screen (hereinafter, referred to as a "second image").

The controller transmits the first image 11 or an image obtained by performing predetermined image processing on the first image 11 to the first image output device such that the image is output to the front screen 101 so as to realize a front screen image 110, and transmits the second image 12 or an image obtained by performing predetermined image processing on the second image 12 to the second image output device such that the floor portion of the second image 12 is output to the floor screen 102 through the second image output device so as to realize a floor screen image 120, since the entire image 10 is an image of a three-dimensional space.

When a signal for image shift is generated, as shown in FIG. 5(b), the image-processor generates a new image part 13, which is shifted in at least one of an Xs direction and a Ys direction.

At this time, the distance Xs and Ys by which the image is shifted may be a value preset by the controller or a value calculated as the distance from the position of the virtual ball to the position of the golf ball 1 on the shot mat SM.

That is, on the assumption that the position of the golf ball 1 is located at the enlarged portion of the image realized through the front screen image 110 and the floor screen image 120, the distance from the position coordinates of the virtual ball on the image to the position coordinates of the golf ball 1 may be calculated, and the image may be shifted by Xs and Ys, which denote the coordinates of the calculated distance.

For example, in the case in which the position coordinates of the virtual ball on the image are (x1, y1) based on a predetermined position and the position coordinates of the actual golf ball 1 are (x2, y2) in the same state, the shift distance Xs may be calculated as x2−x1 or x1−x2, and the shift distance Ys may be calculated as y2−y1 or y1−y2. Here, (Xs, Ys) may be {(x2−x1), (y2−y1)} or {(x1−x2), (y1−y2)} depending on the shift direction.

The entire image 10 is shifted according to Xs and Ys preset as described above or Xs and Ys calculated as described above. As a result, the first image is changed to a part indicated by 11a (hereinafter, referred to as a "shifted first image"), and the second image is changed to a part indicated by 12a (hereinafter, referred to as a "shifted second image"), as shown in FIG. 5(c).

As shown in FIG. 5(c), therefore, the shifted first image 11a or an image obtained by performing predetermined image processing on the shifted first image is output to the front screen 101 through the first image output device in order to realize a front screen image 110, and the shifted second image 12a or an image obtained by performing predetermined image processing on the shifted second image is output to the floor screen 102 through the second image output device in order to realize a floor screen image 120.

In the case in which the distance between the virtual ball and the hole cup on the virtual green in the image is less than the predetermined distance, as described above, an entire image is realized such that the hole cup is located on the floor screen image 120 based on the position of the actual golf ball, and when the user putts the golf ball, a simulation image in which the virtual ball is moved in response thereto is realized only on the floor screen image 120.

Figure 6:
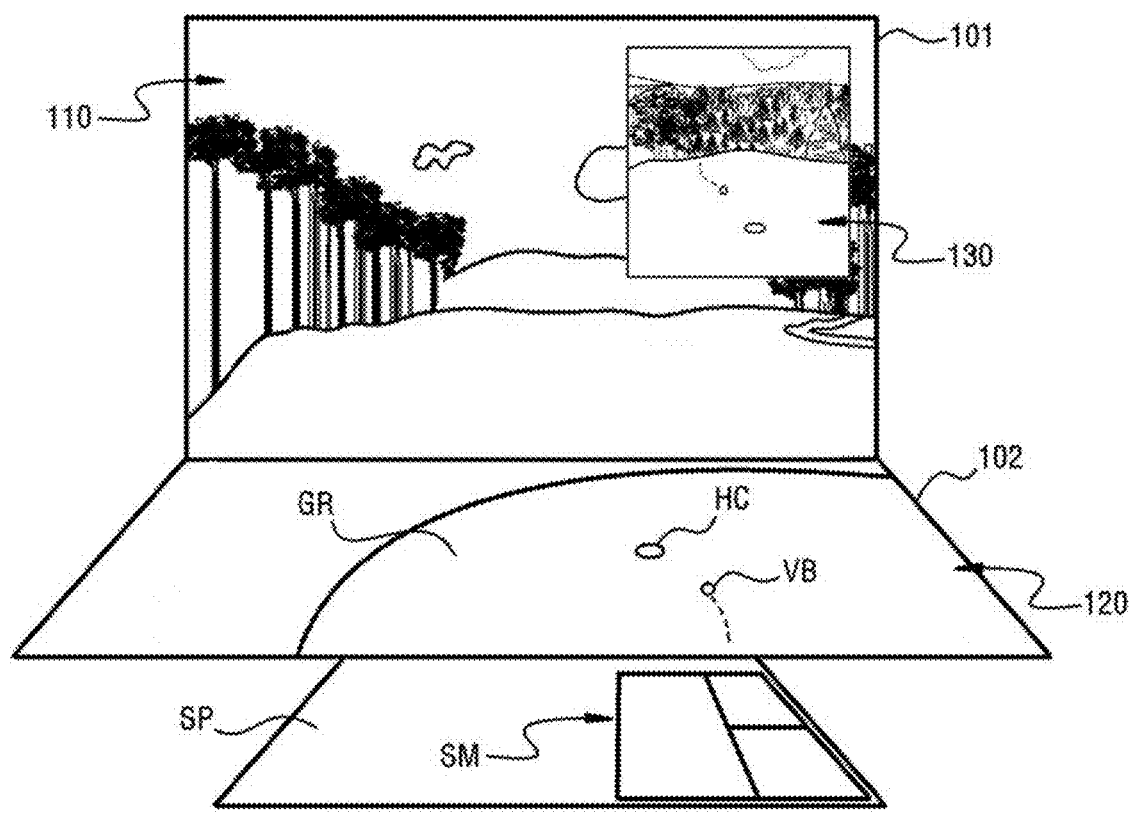

At this time, as shown in FIG. 6, the controller of the simulator may control the image-processor to generate a sub-image 130 that is simulated in the same manner as a simulation image in which the virtual ball VB is moved on the floor screen image 120 as the result of putting such that the sub-image is displayed at one side of the front screen image 110 as a screen having a predetermined size.

On the assumption that a simulation image in which the virtual ball is moved on the floor screen image 120 as the result of putting is a main image, the sub-image 130 may be generated as an image that is simulated in the same manner as the main image while having the same view as the main image or an image that is simulated in the same manner as the main image while having a predetermined view different from the view of the main image. This corresponds to step S134, shown in FIG. 3.

When a simulation image is realized on the floor screen image as the user putts, therefore, the sub-image 130 may be displayed at a predetermined position on the front screen image 110 as a screen having a predetermined size such that other users can more conveniently watch the simulation image according to the putting.

Referring back to FIG. 3, upon determining at step S110 that the distance between the virtual ball and the hole cup on the image is not less than the predetermined distance, the simulator realizes the front screen image and the floor screen image such that the hole cup appears on the front screen image (S114), unlike what is described at steps S111 and S112.

In the case in which the image is realized, as described above, the sensing device senses the user putting the actual golf ball in the standby state (S200).

Upon sensing the user putting the golf ball (S210), the sensing device senses the motion of the golf ball as the result of putting, calculates sensing information of the motion of the golf ball, for example, parameters of the golf ball, such as the speed, the direction, and the angle of the golf ball, and transmits the calculated sensing information to the simulator, which realizes an image in which the virtual ball is moved along the virtual green on the floor screen image in response to the putted golf ball based on the sensing information and in which the front screen image is moved to the floor screen image at a predetermined speed or at a speed corresponding to the movement speed of the virtual ball according to simulation such that the hole cup appears on the floor screen image (S220).

Figure 7:
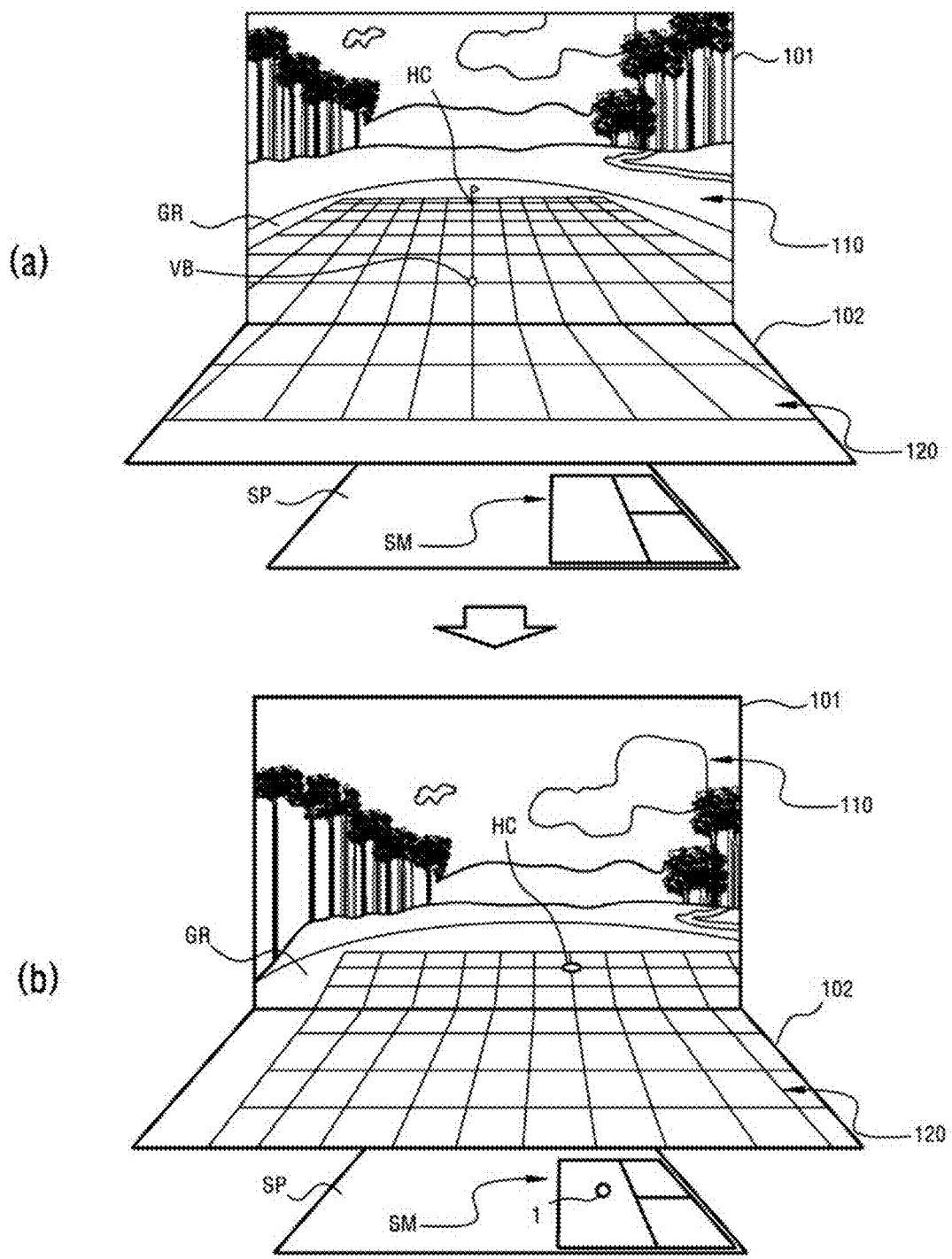
Figure 8:
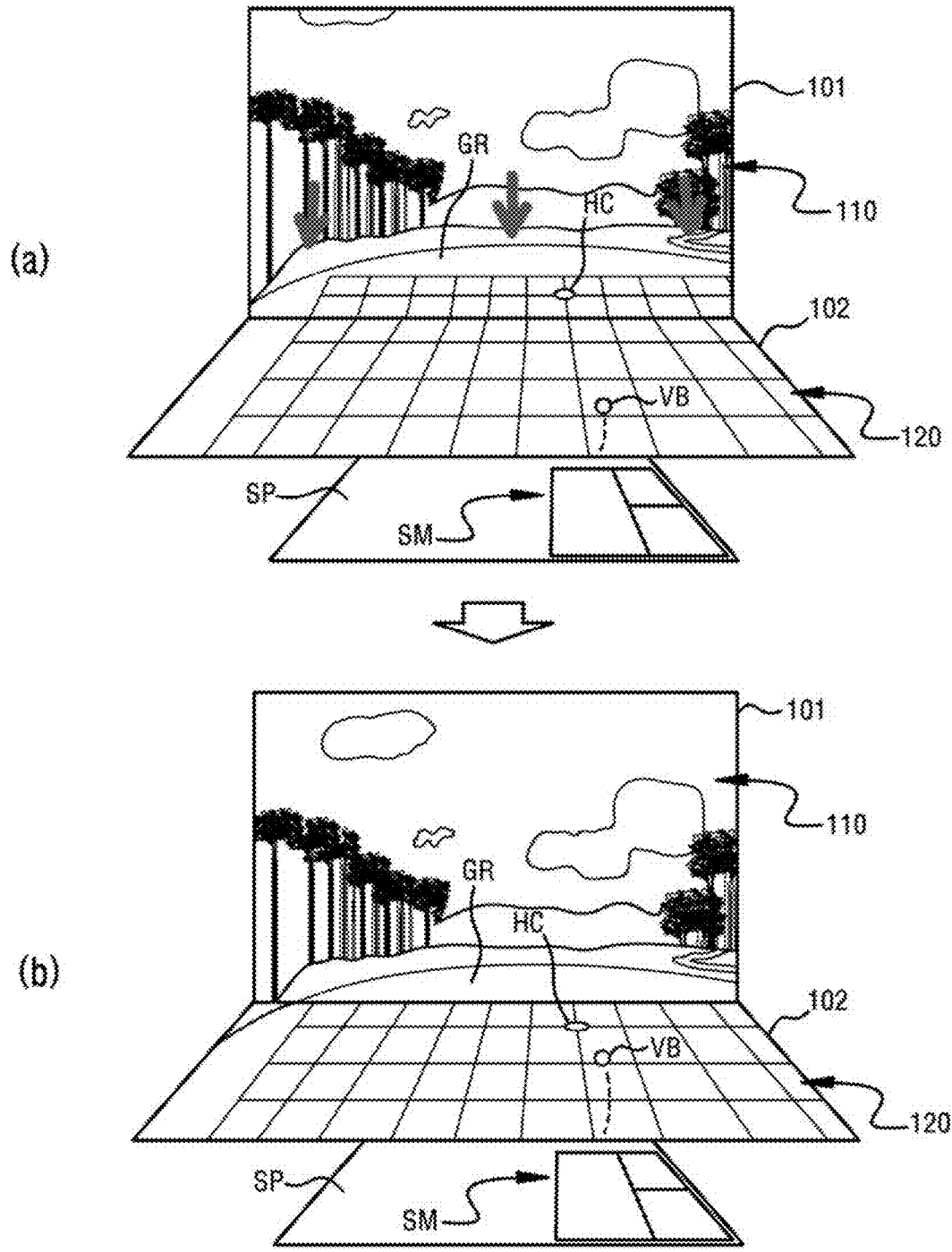

An example of the process performed at steps S114 and S200 to S220 is shown in FIGS. 7 and 8.

Referring to FIG. 7, an image of a virtual green GR and a grid GD indicating information about the topography of the green is realized over the front screen image 110 and the floor screen image 120, and a hole cup HC appears on the front screen image 110, as shown in FIG. 7(a), before the simulator enters the standby state (S200).

In addition, as shown in FIG. 7(a), a virtual ball VB appears on the front screen image 110 so as to face the hole cup HC, and a guide line GL may be displayed from the virtual ball VB to the hole cup HC.

At this time, when a golf ball 1 is placed on the shot mat SM and hitting readiness is completed through the sensing of the sensing device, the controller of the simulator calculates the shift distance and the shift direction from the position of the virtual ball VB to the position of the golf ball 1 placed on the shot mat SM, and performs control such that the image is shifted to the state shown in FIG. 7(b) according to the calculated shift distance and shift direction.

That is, FIG. 7(a) shows the case in which the distance between the hole cup HC and the virtual ball VB is not less than the predetermined distance. In this case, the image is shifted to the state shown in FIG. 7(b) such that the position of the virtual ball appearing on the front screen image 110 coincides with the position of the actual golf ball. Since the distance between the virtual ball and the hole cup is long, an image is realized such that the hole cup appears on the front screen image 110, rather than the floor screen image 120.

Meanwhile, referring to FIG. 8, when the user putts the golf ball 1 in the state shown in FIG. 7(b), a simulation image in which the virtual ball VB is moved on the floor screen image 120 as the result of putting is realized, as shown in FIG. 8(a).

At the same time, as shown in FIG. 8(a), the front screen image 110 is moved to the floor screen image 120 at a predetermined speed or at a speed corresponding to the movement speed of the virtual ball VB according to the simulation image such that the hole cup HC appears on the floor screen image 120, as shown in FIG. 8(b). As a result, an image in which the virtual ball VB is moved toward the hole cup HC on the floor screen image 120 is realized.

In the case in which the hole cup HC is located on the front screen image 110, as described above, a simulation image in which the virtual ball VB is moved as the result of putting the golf ball is realized. In the case in which the front screen image is not moved to the floor screen image but is fixed, the virtual ball VB is moved on the floor screen image 120, is moved to the front screen image 110, and is moved along the front screen image 110.

Since the front screen 101 and the floor screen 102 are substantially perpendicular to each other, however, the boundary therebetween is recognizable even on the image. For this reason, the movement of the virtual ball from the floor screen image 120 to the front screen image 110 may be very unnatural.

In the virtual golf simulation apparatus according to the embodiment of the present invention, therefore, an image is realized such that the virtual ball VB is not moved from the floor screen image 120 to the front screen image 110 on the simulation image based on putting, but the image itself is moved from the front screen to the floor screen, i.e. the image is moved in the opposite direction in response to the movement of the virtual ball VB. Consequently, the simulation image based on putting is realized on the floor screen image 120, whereby it is possible to realize a more natural simulation image.

Of course, although not shown in the drawings, even in this case, a sub-image 120 may be separately generated and displayed at one side of the front screen image 110, as shown in FIG. 6.

As is apparent from the above description, the virtual golf simulation apparatus and the method of realizing the image for virtual golf according to the present invention have advantages in that the virtual golf simulation apparatus, realizing images on the front screen and the floor screen in the user golf play space, realizes an image capable of providing the user who plays golf with greater realism using the front screen image and the floor screen image and in that the simulation image output through the front screen and the floor screen naturally progresses as the golf game progresses.

INDUSTRIAL APPLICABILITY

A virtual golf simulation apparatus and a method of realizing an image for virtual golf according to the present invention are applicable to industries related to golf, in which a user may enjoy a round of virtual golf through golf simulation based on virtual reality.

The invention claimed is:

1. A virtual golf simulation apparatus comprising:
an image output device for outputting an image to a front screen provided in front of a location at which a user putts a golf ball and to a floor screen provided on a floor between a shot plate, on which the user putts the golf ball, and the front screen and outputting an image of a virtual green for putting of the user to the front screen and to the floor screen;
a sensing device for sensing the golf ball and generating sensing information of the golf ball putted by the user; and
a simulator comprising an image-processor for processing an image to be output by the image output device and a controller for performing control such that a simulation image in which a virtual ball is moved on the virtual green is realized based on the sensing information sensed by the sensing device, performing control such that, depending on a distance between the virtual ball and a hole cup on the virtual green, the hole cup appears on the front screen image or on the floor screen image, and performing control such that the simulation image in which the virtual ball is moved is realized on the floor screen image with respect to the hole cup in response to the putting of the user, wherein in a case in which the image of the virtual green is realized on the front screen and on the floor screen such that the hole cup is located on the front screen image, the controller is configured:

to perform control such that a simulation image in which the virtual ball is moved is realized based on the sensing information received from the sensing device when the user putts the golf ball; and to perform control to realize an image in which the front screen image is moved to the floor screen image at a predetermined speed or at a speed corresponding to a movement speed of the virtual ball when the virtual ball is moved in such a manner that the hole cup appears on the floor screen image.

2. The virtual golf simulation apparatus according to claim 1, wherein the image output device comprises a first image output device for outputting an image to the front screen and a second image output device for outputting an image to the floor screen, and the controller divides the image generated by the image-processor into a first image, which is an image part to be output to the front screen, and a second image, which is an image part to be output to the floor screen, and performs control such that the first image is output to the front screen through the first image output device and such that the second image is output to the floor screen through the second image output device.

3. The virtual golf simulation apparatus according to claim 1, wherein the controller is configured:

to receive position information of the golf ball placed at a location at which the golf ball is to be putted from the sensing device; and to perform control such that, in a case in which the distance between the virtual ball and the hole cup on the image is less than a predetermined distance, an image in which the hole cup appears on the floor screen image is realized in such a manner that the distance between the virtual ball and the hole cup becomes substantially equal to a distance between the golf ball and the hole cup.

4. The virtual golf simulation apparatus according to claim 1, wherein the controller is configured:

to receive position information of the golf ball placed at a location at which the golf ball is to be putted from the sensing device;

to preset a relationship between the distance between the virtual ball and the hole cup on the image and a distance between the golf ball and the hole cup; and to perform control such that, in a case in which the distance between the virtual ball and the hole cup is less than a predetermined distance, an image in which the hole cup appears on the floor screen image is realized based on a position of the golf ball according to the predetermined relationship with respect to the distance between the virtual ball and the hole cup.

5. The virtual golf simulation apparatus according to claim 1, wherein the controller performs control such that the image-processor generates a sub-image that is simulated in a same manner as a simulation image in which the virtual ball is moved on the floor screen image and such that the sub-image is output to the front screen.

6. The virtual golf simulation apparatus according to claim 5, wherein the controller performs control such that the sub-image is generated as an image that is simulated in a same manner as a main image, which is a simulation image in which the virtual ball is moved on the floor screen image, while having a same view as the main image or an image that is simulated in a same manner as the main image while having a predetermined view different from the view of the main image and such that the sub-image is displayed at one side of the front screen image as a screen having a predetermined size.

7. A method of realizing an image for virtual golf in which images are output to a front screen provided in front of a location at which a user putts a golf ball and to a floor screen provided on a floor between a shot plate, on which the user putts the golf ball, and the front screen such that an image of a virtual green for putting of the user is realized and output to the front screen and to the floor screen through an image output device, the method comprising:

a sensing device transmitting a result of sensing the golf ball to a controller;

the controller performing control such that, depending on a distance between a virtual ball and a hole cup on the virtual green, an image in which the hole cup appears on the front screen image or on the floor screen image is realized; and the controller performing control such that a simulation image in which the virtual ball is moved on the virtual green is realized on the floor screen image with respect to the hole cup based on sensing information received from the sensing device in response to the putting of the user, wherein the step of performing control such that the image in which the hole cup appears on the front screen image or on the floor screen image is realized comprises:

performing control such that the image of the virtual green is realized on the front screen and on the floor screen such that the hole cup is located on the front screen image, and further comprises:

the controller performing control such that a simulation image in which the virtual ball is moved is realized based on the sensing information received from the sensing device when the user putts the golf ball; and performing control to realize an image in which the front screen image is moved to the floor screen image at a predetermined speed or at a speed corresponding to a movement speed of the virtual ball when the virtual ball is moved in such a manner that the hole cup appears on the floor screen image.

8. The method according to claim 7, further comprising:

the controller receiving position information of the golf ball placed at a location at which the golf ball is to be putted from the sensing device, wherein the step of performing control such that the image in which the hole cup appears on the front screen image or on the floor screen image is realized comprises:

determining whether the distance between the virtual ball and the hole cup on the image is less than a predetermined distance; and upon determining that the distance between the virtual ball and the hole cup is less than the predetermined distance, performing control such that an image in which the hole cup appears on the floor screen image is realized in such a manner that the distance between the virtual ball and the hole cup becomes substantially equal to a distance between the golf ball and the hole cup.

9. The method according to claim 7, further comprising:
the controller receiving position information of the golf ball placed at a location at which the golf ball is to be putted from the sensing device, wherein
the step of performing control such that the image in which the hole cup appears on the front screen image or on the floor screen image is realized comprises:
determining whether the distance between the virtual ball and the hole cup on the image is less than a predetermined distance; and
upon determining that the distance between the virtual ball and the hole cup is less than the predetermined distance, performing control such that an image in which the hole cup appears on the floor screen image is realized based on a position of the golf ball according to a predetermined relationship between the distance between the virtual ball and the hole cup and a distance between the golf ball and the hole cup.

10. The method according to claim 7, further comprising:
generating a sub-image that is simulated in a same manner as a simulation image in which the virtual ball is moved on the floor screen image; and
transmitting the generated sub-image to the image output device such that the sub-image is output to the front screen.

11. The method according to claim 10, wherein the step of generating the sub-image comprises performing control such that the sub-image is generated as an image that is simulated in a same manner as a main image, which is a simulation image in which the virtual ball is moved on the floor screen image, while having a same view as the main image or an image that is simulated in a same manner as the main image while having a predetermined view different from the view of the main image, and the step of performing control such that the sub-image is output to the front screen comprises performing control such that the sub-image is displayed at one side of the front screen image as a screen having a predetermined size.

12. The method according to claim 11, wherein the image is realized such that the sub-image is temporally synchronized with the main image.

13. A computing-device-readable recording medium having a program for performing a method of realizing an image for virtual golf according to claim 7 recorded therein.

* * * * *